United States Patent [19]

Cunningham et al.

[11] 4,233,100
[45] Nov. 11, 1980

[54] METHOD AND APPARATUS FOR MANUFACTURING A LAMINATED SHINGLE

[75] Inventors: Richard N. Cunningham; Douglas D. Smith, both of Jefferson County, Colo.; Romain E. Loeffler, deceased, late of Jefferson County, Colo., by Carolyn R. Loeffler, legal representative

[73] Assignee: Johns-Manville Corporation, Denver, Colo.

[21] Appl. No.: 54,198

[22] Filed: Jul. 2, 1979

[51] Int. Cl.² ............................................. B32B 31/00
[52] U.S. Cl. .................................... 156/260; 156/512
[58] Field of Search ..................... 156/260, 264, 512

[56] References Cited

U.S. PATENT DOCUMENTS

| | | | |
|---|---|---|---|
| 1,794,674 | 3/1931 | Cumfer | 156/512 |
| 1,829,886 | 11/1931 | Yates | 156/512 |
| 3,998,685 | 12/1976 | Czyzewski | 156/260 |

*Primary Examiner*—Douglas J. Drummond

*Attorney, Agent, or Firm*—Robert M. Krone; Joseph J. Kelly; Gregory W. O'Connor

[57] ABSTRACT

The present invention relates to apparatus for forming a series of shingles from two shingle members. In the past such apparatus has required an inordinate number of hand operations and warehousing of such shingle members. These hand operations and warehousing functions have resulted in a substantial number of non-conforming shingles, which must be rejected, and also causing other problems which affect the overall productivity of such prior art apparatus. The present invention anticipates forming from stock material a complete set of such shingle members, maintaining the shingle members in a set in a predetermined positional relationship throughout the manufacturing operation up to and including the formation of stacks of shingles formed thereby. When such a set of shingle members includes a pair of overlay portions formed of interdigitated tabs, the present invention permits these tabs to be defined to form two styles of shingles. Since the set is maintained correlated throughout the laminating and stacking processes, these two styles of shingles can be placed on the roof in a predetermined pattern to enhance the aesthetic appeal of a roof covering made thereby.

19 Claims, 6 Drawing Figures

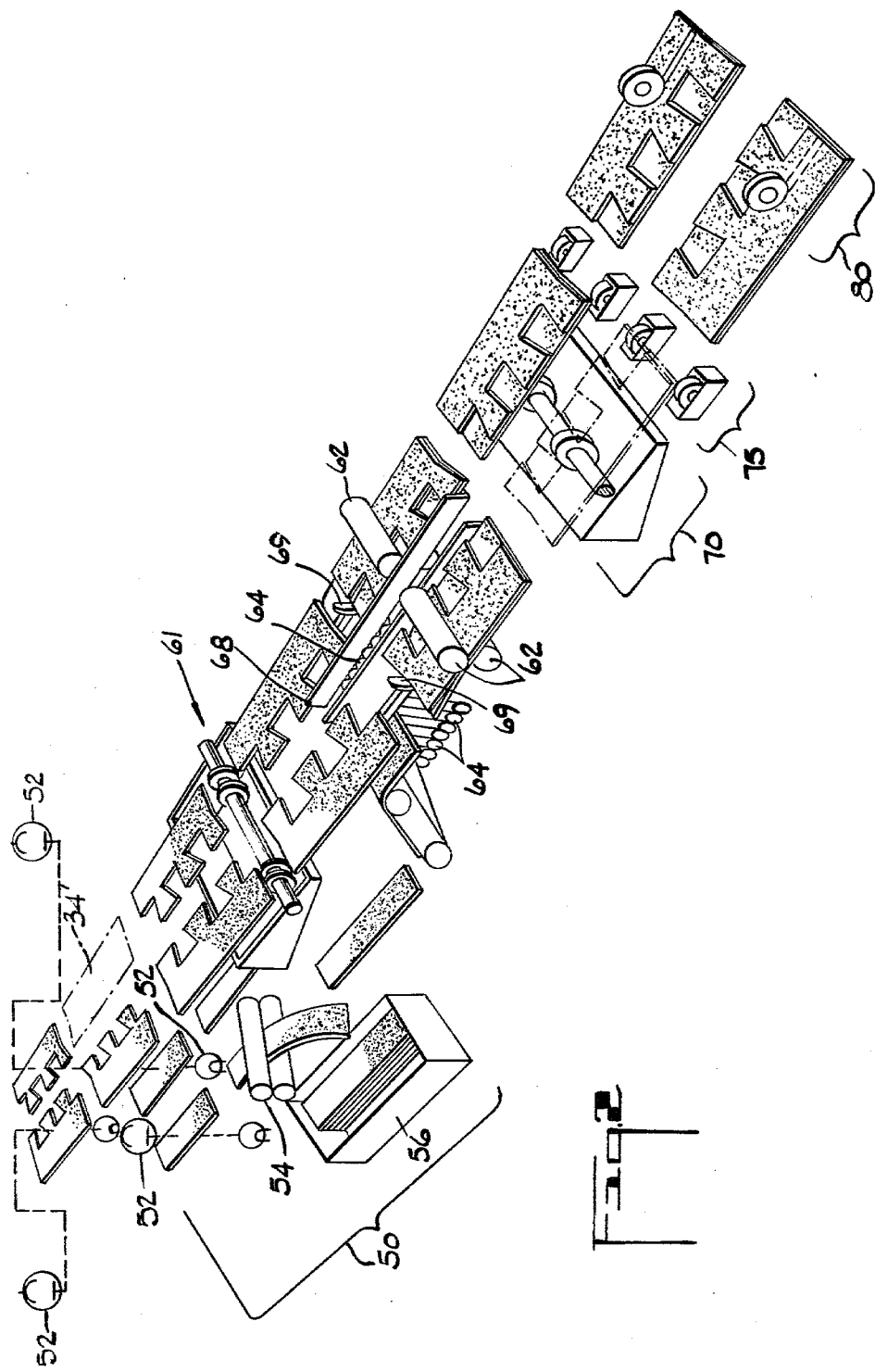

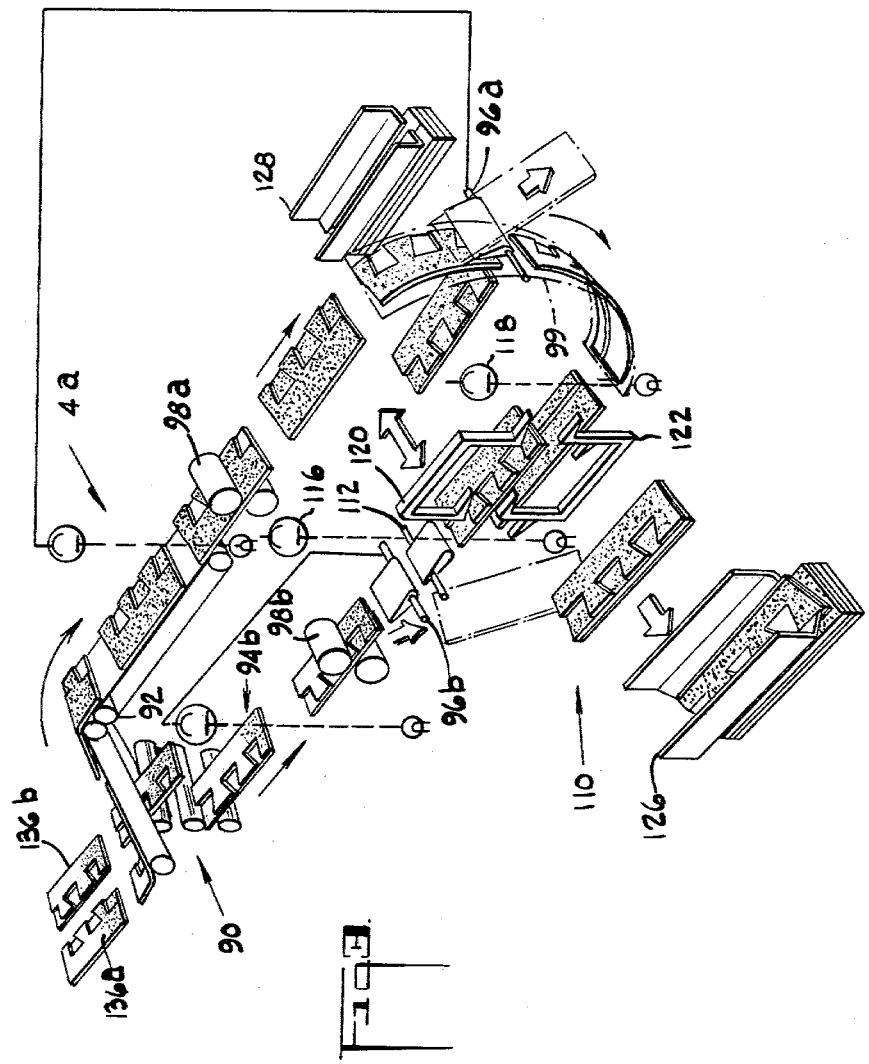

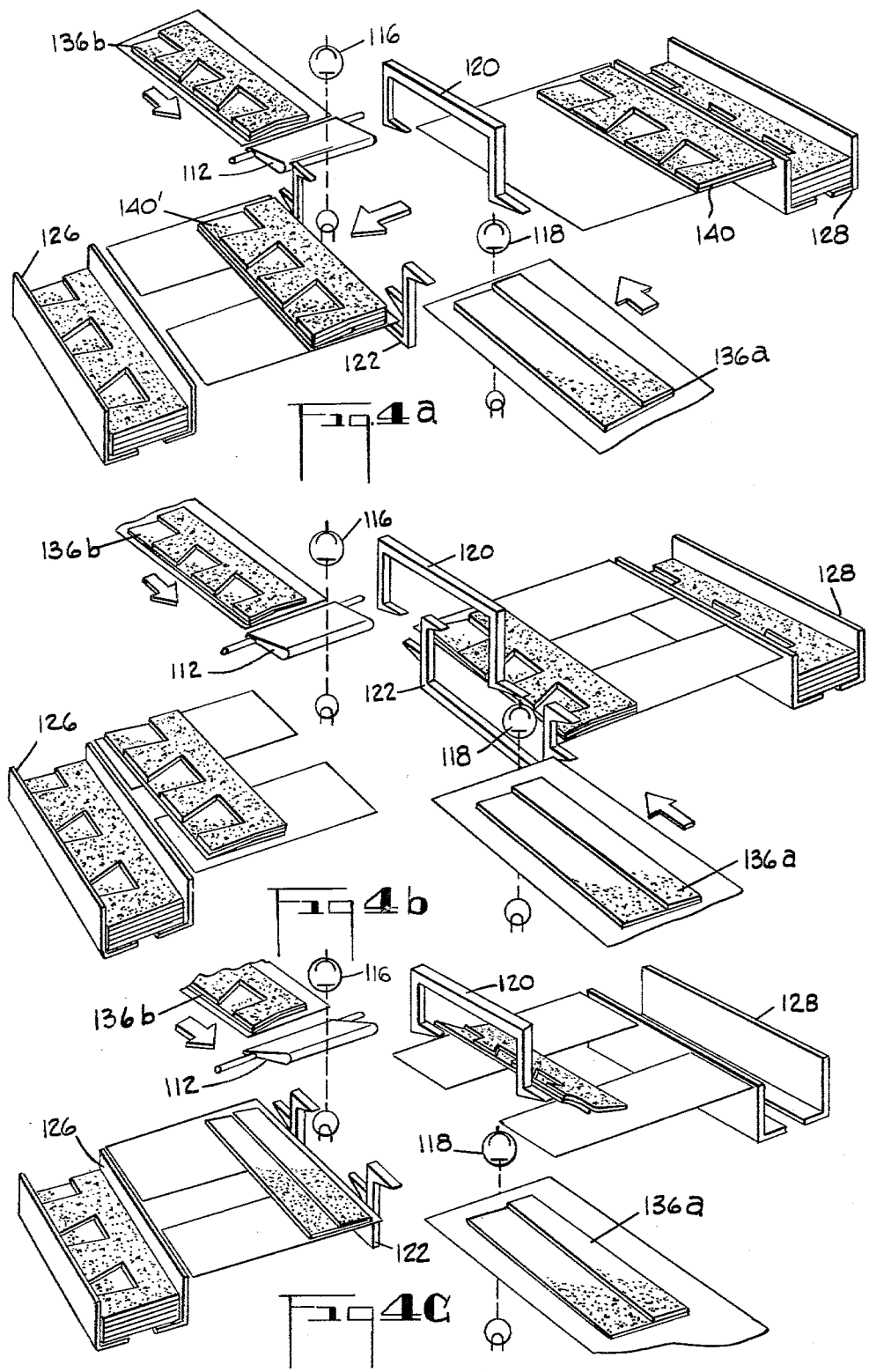

METHOD AND APPARATUS FOR MANUFACTURING A LAMINATED SHINGLE

TECHNICAL FIELD

The disclosed invention relates to systems for manufacturing shingles and in particular laminated roofing shingles comprising generally two portions of a mineral aggregate covered, relatively flexible composition material. This composition material is generally made of a fibrous material, such as organic fiber, mineral fiber or glass fibers which is formed into a non-woven mat. This mat is coated, saturated or otherwise impregnated with a bituminous waterproofing material. The thus waterproofed material is subsequently coated with mineral granules to enhance its weathering capabilities as well as impart the desirable aesthetic surface treatment. The two portions of the shingles are generally designated as an overlay portion and an underlay portion. These two portions are laminated together to form, at least over the exposed portion of the finished shingle, a substantially heavier shingle with concomitant enhanced durability as well as enhanced aesthetic appeal. The machinery used to make such laminated shingles is constructed so as to take the component materials, i.e., mineral granules, bituminous material, and impregnated or unimpregnated mat, and render these components into the completed shingle through a series of operations. Finally, the shingles made thereby are combined with one another to form a standard package such as a bundle for shipment to the installer. Such bundles usually comprise an adequate number of shingles so as to cover a standard measure of roof area, or an even fraction therof.

BACKGROUND OF PRIOR ART

Old systems for making laminated shingles have generally required a number of interruptions in the flow of material from one work station to the next, and have necessitated a number of hand operations which have adversely affected the productivity of manufacturing plants making such roof coverings. In one such system, an apparatus is used to impregnate a fiber glass mat material with a waterproofing compound. Subsequently, one surface is covered with a bituminous adhesive material to which is adhered mineral granules to create a weather surface. The mineral granule coated shingle material continues to a work station where it is cut into a plurality of overlay portions and a plurality of underlay portions. In the case of one system the overlay members comprise a headlap portion and a butt portion. The butt portion thereof consists of a series of relatively randomly shaped tabs with spaces between these tabs. The spaces and tabs are dimensioned so as to permit pairs of overlay portions to be cut with the tabs thereof in an interleaved or interdigitated configuration. At a subsequent work station these overlay and underlay portions are separated from one another and are stacked or otherwise warehoused to await their subsequent lamination with the underlay portions.

Each underlay portion has a length approximately the same as that of the overlay portion and has a width so as to extend from the butt edge across the shingle to the portion approaching the headlap portion of the overlay portion when assembled in the finished shingle. This distance is usually less than the overall width of the overlay portion of the shingle. The underlay portion does not include interdigitated tabs since the underlay portion is a generally rectangular piece of composition shingle material which, when positioned beneath the overlay portion in the completed shingle, includes portions which are positionally aligned beneath the tabs of the overlay portion as well as portions which span the spaces between these tabs.

The overlay portions produced as above are withdrawn from stock and hand-fed onto one belt of a conveyor. This belt passes the overlay portion to a work station where adhesive material is applied to the lower face of the overlay portion along the tabs and along the upper edge of the butt portion. Simultaneously, underlay portions also withdrawn from stock are hand-fed to a work station where an apparatus indexes the underlay portions to a sprocket belt moving at a speed comparable to and along the same general path as the belt bearing the overlay portions past the adhesive applicating station. These two belts subsequently bring the overlay portion and underlay portion into intimate contact thus adhering the underlay portion to the underside of the overlay portion. The substantially completed laminated shingle continues on another conveyor to a work station which applies indicia for aiding in the application of the completed shingle to a roof structure, as well as applies a heat activatable resinous material to seal down the butt edges of the shingle when part of the completed roof shingle structure. Subsequently, shingles are collected at a third work station where shingles are stacked back-to-back and face-to-face to form a bundle of shingles for shipment to the ultimate consumer. The above-outlined process has in the past been successfully used to create a very popular roofing shingle for domestic use, namely the WOODLANDS shingle produced by the Johns-Manville Corporation, Denver, Colo. While the above manufacturing system has been able to produce the WOODLANDS shingle and successfully compete in the marketplace, it has had a number of drawbacks which have resulted in inhibiting the attainment of full productivity of the machinery used in manufacturing the shingle:

1. The prior art system required considerable warehousing and handling of completed underlay portions and overlay portions. Using conventional cutting and laminating machines, the rate at which overlay and underlay portions are produced differs considerably from the rate at which they can be laminated together to form a completed, laminated shingle. Hence, in order to complete the manufacture of a series of laminated shingles (each shingle comprising an overlay portion and an underlay portion) a supply of overlay portions and underlay portions must be accumulated. This accumulation must be produced, transferred to storage, transferred out of storage and inserted into a second production line. This material handling at each step requires a considerable number of hand operations. Such hand operations are inherently slower than the rate at which the finally collated underlay and overlay portions can be laminated together. Also such hand operations tend to be tedious, demeaning and subject to worker apathy, fatigue and hence error. The net result of this mismatch of production capabilities result in the reduction of productivity to about $\frac{1}{3}$ to 1/5 of that achievable using the instant invention.

2. The prior art production system results in the laminating of underlay portions and overlay portions having different lengths. Presuming a $\frac{1}{8}$" tolerance in the overall nominal 36" length for each of the underlay portions and overlay portions, the underlay portion may be as much as ¼" longer or ¼" shorter than its corresponding overlay portion. This problem has a further retarding effect on productivity. An explanation of the cause of this phenomenon and its effect, will point up more clearly the magnitude of this problem and how the instant invention constitutes an improvement over this prior art system.

As was outlined above, the composition shingle material is rendered into the respective overlay portions and underlay portions at a cutting station. This cutting station included a cutter roll which rotates so that the blades positioned thereon have a tangential speed corresponding to the longitudinal speed of the composition shingle material. The cutter roll has blades projecting from its periphery which cut substantially through the composition shingle material to define the width (nominally 14" for the overlay portion and 7" for the underlay portion) and the length of either of these portions (nominally 36"). This cutting operation in more detail is done by pinching the composition shingle material as it moves between the cutter roll and a relatively smooth bias roll. The blades or the cutter roll wear rather quickly and can require replacing after only a few hours of operation. As these blades wear, the effective circumference of the cutter roll diminishes. This in turn causes the length of the shingle portions defined by the cutter roll to shorten proportionally. The conventional cutter system includes a variable ratio mechanical transmission which is operated to change (in this instance to decrease slightly) the rotational speed of the cutter roll in order to compensate for this phenomenon. The amount of speed change and its effect on length is determined by measuring the length of a sample shingle member. Also, as with any material, the composition shingle material has the capability of stretching along its length (depending on its composition, physical characteristics, etc.) when subjected to varying degrees of tension and as a result of the environmental conditions at the time of the cutting operations (i.e., temperature, humidity). Clearly, such a variation in length as the composition shingle material passes beneath the cutting blades of the cutter roll is minimized by careful control of production parameters (e.g., the variable ratio transmission mentioned supra, control of mat weight, composition, etc.). However, it has been found to be impractical to reduce any variation in length less than a nominal ¼" variation from the ideal length. Thus it can be seen that in a given days output (or even in a single production run) there would be overlay portions having lengths up to ¼" greater than the ideal length and also overlay portions being ¼" shorter than the ideal length. Clearly this same phenomenon would affect the length of the underlay portions also.

When laminating the overlay portions to the underlay portions in this prior art system, there was no practical way of correlating undersized overlay portions with equally undersized underlay portions and oversized overlay portions with the equally oversized underlay portions. Hence, as stated above, it is quite possible to have a ¼" difference in length of overlay portion and underlay portion in a shingle. While ¼" in a 36" shingle could be said to affect the aesthetic function of the shingle, the primary disadvantage is that this error would create a considerable potential for leakage in a completed roof. In a given course of shingles in a completed roof, each shingle is placed end-to-end in the course forming a horizontal strip of shingles having, in the case of the WOODLANDS shingle, a series of generally randomly shaped tabs with spaces between the tabs. At the juncture between each shingle in each course, there is formed a vertical seam where the overlay portions are nailed in abutting relationship. The headlap portion of such shingles is covered by the next succeeding course of shingles. However, the underlay portion, if it is for example ¼" longer than the overlay portion, would tend to force this seam open by that ¼". This would create a potential leakage problem if such a non-standard shingle was not eliminated at the factory or by the applicator.

Such variation in relative length of overlay portion and underlay portion in a shingle could cause an intolerable situation if permitted to be sold to the ultimate consumer for application on a roof structure. As is done, however such non-standard shingles are shunted from the production line before bundling and either become scrap or are corrected in some way by another hand or machine operation. In either event, such variation from an optimum shingle results in reduced productivity.

3. In the prior art system the hand feeding of overlay portions and underlay portions into the laminator machinery not only limits the rate in which the shingles can be laminated, but also increases the likelihood of damage to the shingle portions. One example of such production rate limiting and damage-prone operation is the hand feeding of underlay portions from the stack of underlay portions to the moving belt of the laminator apparatus. In this prior art system, stacks of underlay portions are fed to an apparatus which removes the bottom underlay portion from this hand fed stack and, using a pusher, places the individual underlay portion in position on the moving production belt. This operation of removing and positioning is done so that one underlay portion is provided for each overlay portion on the conveyor portion of the laminating apparatus. In order to maintain this one-to-one correlation, the conveyor includes positioning lugs which project from the surface of the belt and impact the individual underlay portions removed from the stack of underlay portions. These laminator belt lugs act to accelerate the otherwise statically positioned underlay portion to full belt speed in an almost instantaneous fashion. The need to accelerate a static underlay portion to the full belt speed at this work station sets an upper limit on as to how fast that belt speed can be. It has been found that this speed is about 150 to 225 feet per minute. Above this speed, depending on weight of the mat, temperature of the asphalt coating, etc., the impact of the lug on the trailing edge of the underlay member would cause a distortion of this trailing edge. Under certain conditions this distortion would either damage the underlay portion to an unacceptable extent or this distortion would aggravate the already bothersome problem of aligning the trailing edges of the underlay and overlay portions at the time of lamination.

BRIEF SUMMARY OF THE INVENTION

The present invention includes a method of forming laminated shingles comprising first providing a substantially continuous web of a composition shingle material; then cutting said web to define a series of sets of shingle members along the length of this web. Each of these sets comprises at least one overlay portion and at least one underlay portion. These shingle members in each set have a predetermined positional relationship to one another in the series. The method further comprises the step of separating the shingle members defined in the cutting step from one another while maintaining these members in said sets and maintaining the sets in the series. Then the sets are conveyed to a laminating work station whereat the step of laminating each underlay portion in the set to an overlay portion from the same set to form a laminated shingle. The shingles formed in the laminating step are collated to form stacks of shingles having a predetermined number of shingles in each stack.

The present invention also includes an apparatus for making laminated shingles comprising a cutter roll for defining, in a substantially continuous web of composition shingle material, a series of sets of shingle members each of these sets of the series of sets comprises at least one underlay portion and one overlay portion. The portions in a set have a predetermined positional relationship with one another in said series. This apparatus also includes means for separating the underlay portions and overlay portions defined by the cutter roll from one another, a conveyor for moving said series of sets of shingle members separated by the separating means to a first work station; an adhesive striper positioned at the first work station in the path of the conveyor for applying adhesive to at least one of said overlay portion and said underlay portion of each of said sets; laminating rollers in the path of the conveyor at said second work station for adhesively bonding each overlay portion in the set to an underlay portion from the same set to form a laminated shingle; and a collator for assembling the laminated shingles into stacks of shingles.

The collator according to the instant invention which operates to form stacks of laminated shingles desirably comprises a first conveyor for serially receiving pairs of laminated shingles and sequentially conveying said pairs of shingles to a shuttle station, means for positioning the pairs of shingles received from said conveyor means such that the shingles in said pairs are back-to-back with one another with the underlay portions of said laminated shingles being nested next to one another in position between the overlay portions of the completed shingles, a system of shuttles at said shuttle station for moving pairs of shingles received sequentially from said conveyor means from said shuttle station to a stacking station whereat said pairs of shingles are formed into stacks of a predetermined number of shingles.

Desirably the conveyor means of said collator includes means for inverting one shingle in each said pairs of shingles so as to bring each of said pairs of shingles into said shuttle station in a back-to-back configuration. Further in its desirable form the collator includes means for detecting the position of the shingles in said pair of shingles as they move along said conveyor and includes an escapement for removing from said conveyor shingles or pairs of shingles such that only the shingles in the pairs of shingles arrive substantially simultaneously at said shuttle station. In its preferred embodiment the system of shuttles at said shuttle station includes a shingle pair shuttle and a single shingle shuttle, the shingle pair shuttle operating to sequentially move said pairs of shingles in a first direction and a second direction to substantially simultaneously form a stack of pairs of shingles in a first stacking position and a stack of pairs of shingles in a second stacking position; a shuttle escapement for positioning a single shingle of a selected pair of shingles in operative engagement with said single shingle shuttle, the single shingle shuttle operating to move the single shingle to one of said first stacking positions and said second stacking positions so as to form said stacks of shingles having an odd number of shingles therein.

BRIEF DESCRIPTION OF THE DRAWINGS

FIG. 2 shows a continuation of the apparatus shown in FIG. 1.

FIG. 3 shows a continuation of the apparatus shown in FIGS. 1 and 2 and shows the preferred form of the collator apparatus according to the instant invention.

FIGS. 4a, 4b and 4c show the preferred sequence of the operation of the shuttle system portion of the collator shown in FIG. 3.

DETAILED DESCRIPTION OF THE INVENTION

Figure 1:
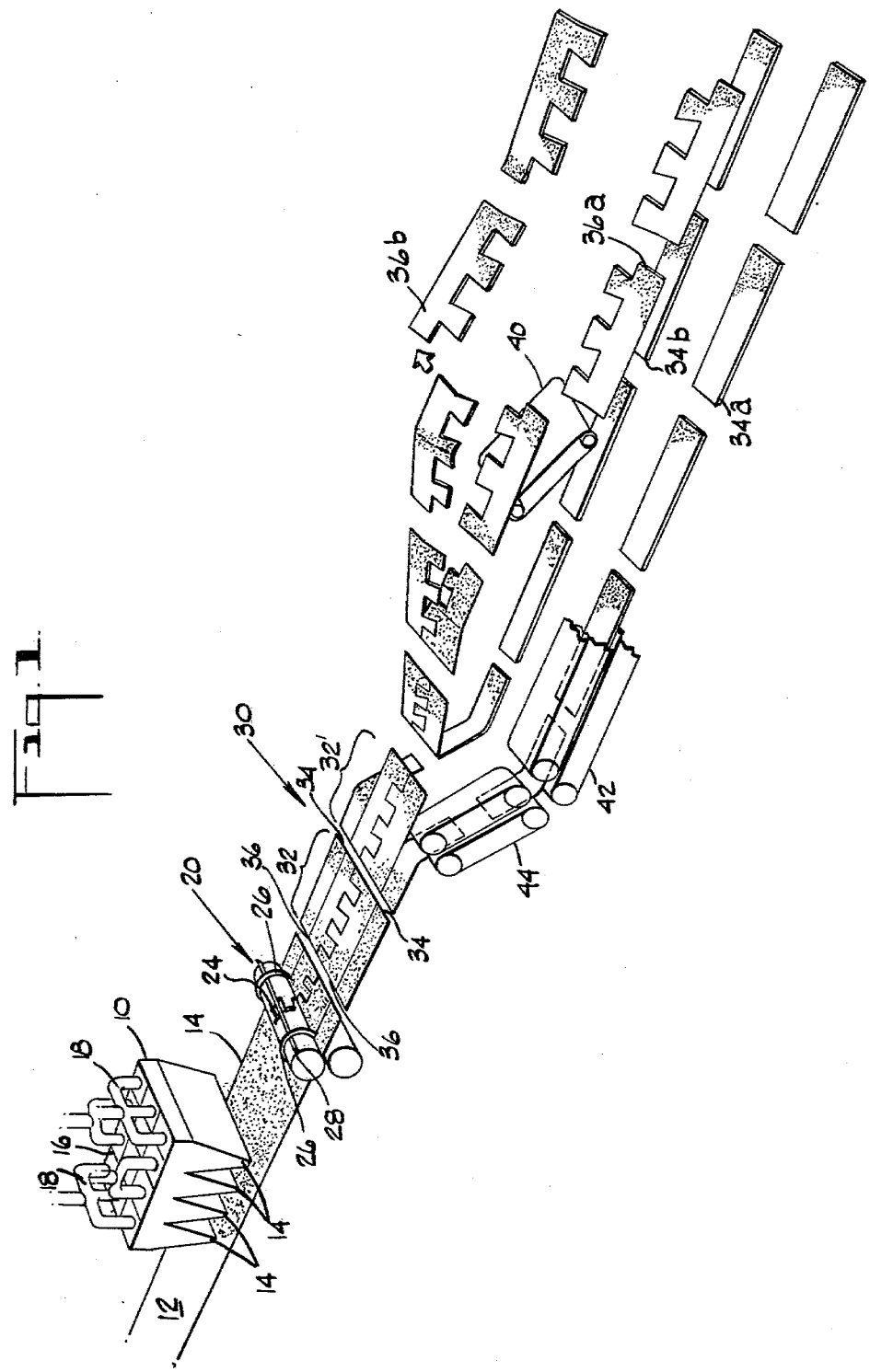
FIG. 1 shows a first portion of the preferred apparatus according to the instant invention.

The system of forming the laminated shingles in accordance with the present invention can best be understood with reference to the accompanying figures wherein like numerals refer to like structures throughout the figures. The overall system can be more fully appreciated when the apparatus associated therewith is described in a sequence paralleling the sequence of operations which forms the laminated shingle from the web of stock material. FIG. 1 shows the first four operations in the preferred system. A web of stock material 12 is unrolled in a manner well known in the prior art. This web of stock material in the preferred embodiment comprises an asphalt waterproofed mat of non-woven fiber glass. This mat comprises essentially glass fibers and a minor amount of a binding agent. To the upper surface thereof is applied a coat of an adhesive bituminous substance. While in an adhesive state, the adhesive coated surface is passed below slate drop apparatus 10. In the preferred embodiment, slate drop apparatus 10 includes a plurality of slate drop bins 15. Bins 15 have contained therein mineral granules of the type well known in the roofing industry. These granules are preferably of a plurality of colors and are applied to the adhesive coated surface to provide a weather coating found to provide a long lasting, weatherproof surface on the completed shingle. It has been found desirable, for reasons which will become more apparent as the overall system is set forth, to provide slate drop bins with dividers 16. The purpose of dividers 16 is to segregate the mineral granules of different colors which are provided to each bin 15 by supply ducts 18. As is well known in the shingle fabricating art, slate bins 15 include a shutter-like gate at the bottom thereof to controllably open and close the bins to permit mineral granules to be deposited on the adhesive surface of mat 12. These bins 15 are operated by a known control system in a substantially random sequential fashion so as to deposit mineral granules of different colors in contrasting color bands upon the mat. These bands, also known as color drops, provide an aesthetically pleasing variation in mineral granule color which in turn simulates the variation in tones of for example a traditional shake covered roof. It should be noted that supply ducts 18 are situated so as to provide different portions of bins 15 with the same color of mineral granule. Dividers 16 maintain these differently colored granules in separate portions of each bin 15. In this way not only does each bin 15 deposit contrasting colors of mineral granules but each bin 15 deposits up to three different colors of mineral granules with each color drop. As will be more fully explained later, dividers 16 are positioned so as to provide these different colored granules in bands parallel with the direction of mat which substantially correspond to the underlay portions and overlay portions which are defined by the cutter in a later operation. These dividers 16 are an optional feature although the desirability thereof will become apparent.

Of course further apparatus is positioned between slate drop apparatus and cutter roll 20 and operate on material 14 to prepare it for its ultimate use. These apparatus preferably include a slate roll to press the granules into the adhesive coated surface, apparatus for applying backing material (such as sand) to the back side of material 14, and a cooling or tempering section to condition the material 14 for proper cutter roll operation. These apparatus, as well as slate drop apparatus 10 and cutter roll 20, are not new. Apparatus 10 has been shown in FIG. 1 only for the purpose of clarifying the operation and advantages of the instant invention.

Subsequently, the now formed web of shingle material continues to cutter roll 20 and bias roll 22. At the outset, it should be pointed out that the particular orientation of these rolls shown in FIG. 1 is not the one actually used in the disclosed invention nor is it one which is used by the industry at large. For reasons of clarity, the cutter roll 20 is shown on the top or mineral granule covered surface of composition shingle material 14. In reality cutter roll 20 would be contacting the bottom or plain mat surface of material 14 with the bias roller 22 above. This orientation is clearly more desirable than that schematically shown in FIG. 1 since the blades positioned on cutter roll 20 need not pierce the mineral granule covered surface and hence have a much greater life cycle. As is the practice in the shingle industry, the blades positioned on cutter roll 20 cut into and through substantially only the mat 12 leaving the adhesive layer, with its accompanying mineral granule coating, undisturbed. This system prolongs cutter roll life as well as utilizes the adhesive coating to maintain the relative position of all the shingle members defined by cutter roll 20 until it is desirable to separate these members in a later operation. For purposes of clarity however, cutter roll 20 is shown above material 14.

In this schematic showing it can be seen that cutter roll 20 has blades 26 positioned on its surface. Blades 26 define a pair of substantially continuous cuts parallel to the longitudinal length of material 14. Cutter roll 20 includes blades 24 which define a substantially zigzag or "dragons' teeth" configuration comprising a series of interdigitated tabs of each pair of shingle overlay portions 36a and 36b. In the preferred embodiment, cutter blade 24 is configured to form a series of tabs which differ from one another within each overlay member 36 so as to form a wooden shake simulating tab. As will be set forth more fully below, blades 24 are further most desirably shaped so as to define overlay portion 36a which differs in overall configuration quite considerably from its opposite overlay portion 36b.

In association with blades 26 and blades 24 is a further blade 28. Blade 28 extends fully across the width of material 14 and in so doing defines a segment of said web 32. As can be seen from FIG. 1, segment 32 in the preferred embodiment comprises a pair of substantially identical underlay portions 34 and a pair of overlay portions 36 comprising overlay portion 36a and overlay portion 36b. This blade configuration is most desirable in solving one of the major problems of the prior art shingle forming devices. Thus the effective circumference of cutter roll 20 defines the overall length of shingle members 34 and 36. As these shingle members in each mat segment 32 are cut simultaneously from 14, there is considerable assurance that such members in the same segment will be of virtually precisely the same length since the mat, when cut, is under the same conditions across the width of the mat. Such conditions as relative humidity, temperature, degree of blade wear, mat weight and the tension on the mat as it passes cutter roll 20 can affect the net length of the completed shingle members and hence the completed laminated shingle. Variation in these conditions however has little affect on the relative sizes of underlay portions 34 and portions 36 within a segment 32 because of their substantially cotemporaneous creation by cutter roll 20.

Hence it can be said that cutter roll 20 and its associated bias roll 22 operate to define a series of sets of shingle members. In its broadest sense, a set of shingle members comprises at least one shingle overlay portion 36 and a shingle underlay portion 34. In the preferred embodiment, as is clear from FIG. 1, such a set would consist of a pair of shingle overlay portions 36 (desirably shingle member 36a and shingle member 36b) and a pair of shingle underlay portions 34. It should be noted however that such a set need not be defined or obtained from a single segment 32, although such a correlation between a set of shingle members and the shingle members derived from a single segment has certain desirable characteristics. It is quite possible that a set of shingle members could comprise an overlay portion say for example from the segment 32 and a shingle underlay portion derived from the just preceding segment 32'. The primary requirement, and that which would fulfill most if not all of the desirable features of the present invention, is that the members making up a set should have a predetermined positional relationship with one another in the series of sets defined by cutter roll 20. Clearly this would be the case for the hypothetical situation outlined above. As the overlay portion 36 in segment 32 passes along the apparatus of the instant invention, it remains in a predetermined positional relationship with underlay portion 34 defined in segment 32a. This positional relationship (or any other positional relationship meeting the criteria of this disclosure) can be maintained by the disclosed apparatus up to and including the time that the shingle members making up a set are laminated together to form a completed laminated shingle. Hence the predetermined positional relationship of the shingle members in a set of shingle members does not require that the members in such a set be derived from the same segment 32. All that is required then is that this predetermined positional relationship be maintained up to and including the step of laminating of the members in a set to form a substantially completed laminated shingle. This feature stands in stark contrast with that which has gone before in laminating systems known to Applicants wherein any positional relationship between underlay portions and overlay portions, if it ever existed in the first place, is lost through a system of hand or machine operations. As stated before, this prior art laminating system resulted in the overlay portions and underlay portions in a laminated shingle being of different lengths. This in turn resulted in a high degree of rejected shingles or potential for leakage when non-standard shingles were placed on a roof deck.

The shingle members defined by the cutter roll continue to a point at which they are separated from one another. This step of separating is desirable in order to permit subsequent operations on the various members in preparation for their subsequent lamination. The separating apparatus is of the type generally known in the industry and preferably consists of a series of cogwheel powered belts 44 which grip the upper and lower surfaces of the cut mat 14 and, by first accelerating the segments 32 from one another and subsequently by diverging the paths of the underlay portions from the overlay portions, succeeds in separating the members substantially as shown in FIG. 1. An example of the type of apparatus used to perform this step in the operation is disclosed in U.S. Pat. No. 2,258,428. Once separated the interdigitated tab portions of overlay portions 36 are separated by a further divergence (at 37) of the paths of the belts (not shown) carrying overlay portions 36a and 36b. Once separated from one another the overlay portions 36 are moved laterally away from one another by angled belts 40 which position the overlay portions 36 in a substantially vertically aligned position over the underlay portions in the same set.

Throughout the above-outlined separating operation it is understood that while certain mechanisms are shown in association with only one side of the overall separating and conveying apparatus shown in FIG. 1, there is an equivalent set of mechanisms on the other side. In the preferred embodiment, the pairs of overlay portions and underlay portions which make up the set of shingle members in the preferred embodiment are subjected to a substantially equivalent series of maneuvers and operations. Such maneuvers and operations include the use of acceleration rolls, cog-driven belts, angled belts or rollers and such which all contribute to altering the position of the shingle members relative to one another but at the same time maintaining the predetermined positional relationship of the members of the set in the series of sets. Thus these mechanisms where possible maintain the sets of members as defined previously. Such predetermined positional relationship is not destroyed when, as for example in the hypothetical situation set forth supra, separating belts 44 also accelerate these underlay portions so that the underlay portions become associated with the overlay portions defined in the just preceding segment. Hence, such an acceleration operation by belts 44 results in a set being made up of shingle members which have not been defined from the same segment thus implementing the hypothetical situation as set forth supra.

The sets of shingle members defined, separated and positioned by the apparatus shown in FIG. 1 continue on a conveying apparatus of a known type to the machinery shown in FIG. 2. Along the path of conveying apparatus shown in FIG. 2 is shingle member escapement system 50. For reasons of clarity only one such escapement 50 is shown although it should be understood that in the conveyor path of each shingle member in a set there would be such an escapement. In Applicants' preferred embodiment, there are four sets of escapements 50 preferably positioned at about the location shown along the conveying apparatus. Each shingle member escapement apparatus includes a photoeye detecting system shown schematically at 52, angled acceleration rollers 54, and shingle member bin 56. Each of the four escapement systems in Applicants' preferred embodiment operates together in the following fashion. Photoeye system 52 detects the presence or absence of each shingle member as it moves alog the conveyor apparatus in sets as defined above. Should any one of the photoeye apparatus 52 fail to detect a shingle member at a position where there should be a shingle member, (such as in the case of missing overlay portion 34b' shown in phantom) each of the other escapement systems 50 operates to eject the remaining shingle members from the conveyor to their respective bins 56. This is done by indexing the remaining shingle members away from the cnveyor apparatus in order to bring it into engagement with angled accelertion rollers 54. Acceleration rollers 54 grip the thus indexed shingle member and accelerate it away from the remaining complete sets of shingle members in the series of sets on the conveyor apparatus, and into the respective bins 56 for subsequent collection and reuse. In this manner only complete sets of shingle members are allowed to continue to the laminating work station. Also, such an operation maintains all the other undisturbed sets as sets of shingle members. If the incomplete set eliminated by the operation of the shingle member escapements 50 were permitted to continue along the laminating apparatus certain undesirable events would take place. For example, an overlay portion without a corresponding underlay portion would have the laminating adhesive applied thereto. The overlay portion would continue to the laminating rolls 62 which would attempt to laminate the thus adhesive coated overlay portion to a nonexistant underlay portion. Adhesive from this overlay portion would contaminate the laminating rolls since there would be no underlay portion interposed therebetween to receive the adhesive positioned on the underside of that overlay portion. Also, as will be more fully set forth eliminating all the unmatched shingle members (i.e., shingle members not comprising a set) at this point aids in forming the pairs of back-to-back shingles at the collating apparatus.

After the shingle member escapement apparatus has removed all but complete sets of shingle members from the conveyor apparatus, the remaining overlay portions 36a and 36b pass over adhesive striping apparatus 61. The adhesive striping apparatus 61 is of a generally known type and consists of a heated vat of asphaltic adhesive through which turn a plurality of adhesive application wheels. These wheels rotatably operate to pick up the adhesive material from the vat and lay an equivalent number of stripes of adhesive on the lower face of the overlay portions passing thereover. Preferably these wheels are positioned to apply a plurality of stripes of adhesive on the lower face of each tab as well as preferably one stripe of adhesive along a common bonding area which extends the full length of the overlay portion adjacent to the upper edge of the butt portion of each overlay portion. The now adhesive coated overlay portions continue on the conveying apparatus to a station where the underlay portions are properly laterally aligned with their respective overlay portions in each set. Preferably underlay portions 34 are shifted laterally by angled positioning rollers 64. The undersurface of each underlay portion as it approaches its respective overlay portion is frictionally engaged by rotating underlay position rollers 64. These rollers, being angled towards positioning fence 68, cause the underlay to shift laterally towards positioning fence 68. One edge of the underlay portions rides along positioning fence 68. Corresponding overlay portions in the set are already positioned on an upper extremity of the positioning fence 68. Hence, when the shingle members pass between laminating rolls 62, the lower edges of each are correctly aligned such that lower edge of each tab is positioned over the lower edge of the underlay portion. Precise longitudinal alignment of the respective overlay portions and underlay portions is assured by positioning lug 69 which engages the trailing edges of the overlay portions and underlay portions as they are brought together by the conveying apparatus and advanced between the laminating rolls 62.

Subsequent to the laminating operation other optional and conventional operations can be performed to ready the laminted shingle for subsequent stacking and bundling. For example, at work station 70 a stripe of heat activatable adhesive sealing material is applied along the underside of the butt edge of each shingle. This feature provides a means of holding the butt edge of the shingle down when positioned on a roof deck to increase its resistance to wind damage. At work station 75 the shingle is cooled by a set of cooling wheels in order to set the heat activatable sealing adhesive and prevent sealing of one shingle to the other while in stacked condition. Finally, at work station 80 nailing indicia or other such installation aids are applied to the completed laminated shingle.

Turning to FIG. 3, the preferred form the collating apparatus according to Applicants' invention is shown receiving the shingles from work station 80. As stated previously, Applicants have found it preferable to define a set of shingle members such that said set consists of two underlay portions and two overlay portions which is comprised of shingle members derived from the same segment of composite roofing material. One benefit in obtaining the shingle overlay portions in a set from the same segment of roofing material is that the overlay portions can be defined by cutter roll 20 such that each differs from one another to a considerable degree, at least to the extent that the tabs and spaces between the tabs differ in width to simulate rustic wooden shingles. In order to eliminate extra steps in the installation of such shingles Applicants have found it beneficial to maintain said pairs of shingles derived from the pair of differing overlay portions (previously designated as overlay portion 36a and overlay portion 36b) in back-to-back pairs so that the installer can merely remove the shingles from the bundle and install the shingles in the order in which they are removed. The collating apparatus shown in FIG. 3 accomplishes this by forming these pairs of shingles and then forming stacks of these pairs for subsequent bundling. In order to clarify the operation of collator apparatus shown in FIG. 3, the shingles entering the collating apparatus are designated as 136a and 136b to illustrate the relationship of these shingles respectively with overlay portions 36a and overlay portion 36b from which they have been formed. Also for clarity the collating apparatus is shown in a highly simplified form. It should be understood that the apparatus in actual working embodiment includes cog conveying belts, angled rollers, chutes and ramps to accomplish the movement and positioning of the shingles as shown in FIG. 3. All of these various machines are of known construction and are well within the skill of an engineer in the conveying art. Where such machines differ from that known in the art, a detailed description will be incorporated in the explanation of the overall collating apparatus.

The first positioning task to be accomplished by the collating apparatus is to bring the shingles which will be subsequently combined into the back-to-back pairs of shingles into substantial vertical alignment with one another. In the preferred embodiment of the laminating apparatus as previously described, such shingles are generated horizontally next to one another. Hence laminated shingles 136b are shifted laterally by angle rollers 90 while substantially simultaneously laminated shingles 136a are raised above the now laterally shifted shingles 136b by known conveying means 92. As shingles 136a have a greater distance to travel than do shingles 136b in the same set, conveying apparatus 92 must accelerate the shingles 136b in order to maintain the positional correspondence required by the subsequent apparatus. In any event, collating apparatus includes photoelectric detecting apparatus 94a and 94b which determines the presence or absence of each shingle in a pair of shingles and operates ejector gates 96a and 96b such that any shingle which does not have a corresponding shingle in a pair, or any set of shingles having shingles which fail to have an adequately precise positional alignment with one another, are removed by ejector gates 96a and 96b from the collating apparatus. This detection and ejecting apparatus assures that the remaining pairs of shingles are precisely positionally aligned with one another at this point in the collator. This in turn is desirable since the operation of the shuttle apparatus which forms stacks of such pairs requires that the shingles arrive in the shuttle apparatus at substantially precisely the same time. The time alloted for the cycling of the shuttle, because of the close spacing of the shingles as they progress through the automated forming and laminating apparatus, does not permit one shingle of a pair of shingles to lag and hence interrupt this cycling operation. To this end the detection apparatus 94a, 94b and ejector gates 96a and 96b operate together to assure this substantial simultaneous arrival of each shingle in the pairs of shingles at the shuttle station.

After being detected by photoelectric detecting means 94a and 94b each shingle is accelerated by accelerating rollers 98a and 98b. Once again the shingles 136a, as they have a greater distance to travel, are accelerated to a higher speed by their respective acceleration rolls in comparison to the acceleration rolls associated with shingles 136a. Not only is there a greater distance to travel but that travel entails the use of a curved chute 99 which frictionally engages the mineral aggregate coated face of each shingle 136a, thus slowing its progress to the shuttle station. This curved chute is shown in phantom in FIG. 3 in order to clearly show the path of each shingle 136a along its inner surface. Such a chute is however a common conveying expedient. The particular chute construction found desirable in the present application is coated on its shingle engaging surface with a ceramic coating in order to reduce the frictional forces to a minimum and also make that frictional surface durable to resist the abrading characteristics of the mineral aggregate coated surface of the shingles. Each shingle 136a is accelerated by acceleration rolls 98a, travels in a curving path, and arrives at shuttle station 110 in an inverted orientation as shown.

The reason for this inversion becomes apparent when one considers the cross-sectional configuration of the laminated shingles according to the preferred embodiment. This cross-sectional configuration shows one longitudinal portion of each shingle comprising generally two thicknesses of composite shingle material while the other longitudinal half of the shingle comprises only one thickness thereof. If a stack of shingles were formed such that all the double-thick portions of the shingles were on one side of the stack and all the single-thick portions were on the other side of the stack, there is likelihood that the shingle would be damaged at the juncture of the single-thick and double-thick portions. Also, the stacks formed in this manner would be much thicker on the double-thick side than the single-thick side. A stack of any reasonable number of shingles would tend to fall over as well as being difficult to wrap or bundle for shipping. Also such bundles would comprise a volume of space out of proportion with the number of shingles in the bundle since there would be substantial voids between the single-thick portions of shingles in the bundle.

Hence, when shingles 136a and 136b arrive at the shuttle station 110 they form a pair of shingles having the underlay portions thereof nested next to one another between the overlay portions. In cross-section then such a pair of shingles would comprise of only three thicknesses of composite shingle material and be substantially uniformly thick across its width.

Associated with shuttle station 110 are shuttles 120 and 122, escapement 112, and jogger boxes 126 and 128 which cooperate to substantially simultaneously form two stacks of shingles. These stacks are subsequently packaged in a known manner to form bundles of shingles for subsequent distribution and sale.

Attention is directed to FIGS. 4a, 4b and 4c which show in greater detail the formation and distribution of the pairs of shingles at the shuttle station. As seen in FIG. 4a there is positioned in the path of shingles 136b a shingle positioning escapement 112. Escapement 112 has a first position which places shingles 136b in the path of shingle pair shuttle 122. Shingle positioning escapement 112 has a second position which deflects shingles 136b to an upper position in the shingle shuttle station. This second position places shingles 136b in the path of single shingle shuttle 120 positioned above shingle pair shuttle 122. Positioned between escapement 112 and the shingle shuttles 120 and 122 is photoeye detector 116 which determines when each of the shingles 136b has been positioned in the shuttle station by detecting the trailing edge of each shingle 136b. On the other side of the shingle shuttle station is shown the shingle 136a after it has been inverted by collator apparatus shown in FIG. 3. Each shingle 136a arrives at the shuttle station in a lowermost position in the path of shingle pair shuttle 122. Photoelectric detector 118 operates in a similar manner as that of detector 116 in that it detects the trailing edge of each shingle 136a in order to determine when each such shingle is properly positioned in the path of shingle pair shuttle 122. Also shown in FIG. 4a is shingle pair 140 which has just been moved by double shingle shuttle 122 towards jogger box 128 wherein a stack containing a predetermined number of shingles is already being formed. Also shown in FIG. 4a is shingle pair 140' which has been moved towards jogger box 126 by the movement of double shingle shuttle 122 just prior to the movement which brought shuttle 122 to its shown position. Also in jogger box 126 are shown shingles which are a part of the stack of shingles being formed therein. From this it can be seen that the next movement of double shingle shuttle 122 will be toward the right of FIG. 4a and will move a pair of shingles, which will be made up of the shingles 136a and 136b as shown approaching the shuttle station from opposite directions, towards jogger box 128. This shingle pair will clearly be composed of shingle 136a placed below shingle 136b with the underlay portions thereof nested next to one another between outwardly facing overlay portions. The exact sequence of this operation will now be set forth.

As shingle 136b approaches the shuttle station it passes over shingle positioning escapement 112 in its first position and hence continues to a position in the path of double shingle shuttle 122. In traversing this path it is sensed by photoelectric device 116. Substantially simultaneously shingle 136a advances on the shuttle station along its path which will take it into the path of the shingle pair shuttle below the just arriving shingle 136b. Shingle 136a will also be detected by photoelectric device 118. The trailing edges of the arriving shingle 136a and shingle 136b are sensed by their respective photoelectric devices 116 and 118. In response to this sensing, shingle pair shuttle 122 moves in response to the signals generated thereby. This movement slides 136b from its intermediate position tray (not shown) and simultaneously slides shingle 136a from its lowermost tray (not shown) thus forming a pair of shingles substantially identical to other pairs of shingles formed by the previous operations of the collating device. The shingle pair shuttle 122 accelerates this pair and causes it to continue in the path just traversed by shingle pair 140 to jogger box 128.

FIG. 4b shows the next operation of the collating device. Here the next shingle 136a from the conveyor shown about to arrive at the shuttle station as is shown the next shingle 136b. Shingle pair shuttle is shown in its right-most position awaiting the detection of the trailing edges of the just arriving shingles before it will again traverse across the trays containing the shingles to form another pair of shingles. Clearly this pair will move to the left and to jogger box 126.

FIG. 4c shows the operation of shingle positioning escapement 112 and single shingle shuttle 120. This operation permits the formation of shingle stacks which consist of an odd number of shingles rather than an even number resulting from complete shingle pairs. This feature is desirable where the total coverage of the shingles in the shingle stack is such that, in order to comprise an even division of a standard measure of coverage (for example 1 square or 100 sq. ft.), it is necessary to have something besides an even number of shingles. This operation is accomplished by splitting a pair of shingles 64 causing one shingle of a pair of shingles to eventually move to jogger box 126 or alternatively to jogger box 128 and the other of this pair of shingles moving to the other jogger box. More precisely it could be said that the operation of single shingle shuttle 120 and shingle positioning escapement 112 cooperate to prevent the formation of a pair of shingles rather than to split such a pair up into single shingles. In any event, as can be seen from FIG. 4c, 112 is positioned in its second position wherein shingle 136b had been placed prior to the movement of single shingle shuttle 120 into an extreme upper tray (not shown). In this position shingle 136b is above the path of shingle pair shuttle 122 and placed in the path of single shingle shuttle 120 passing directly thereover. Shingle 136a on the other hand, as with all preceding shingles 136a, is moved to the lowest-most position at the shingle shuttle station, and hence is moved by shingle pair shuttle 122 to the right or left. This takes place whether or not it is subsequently paired with a corresponding shingle 136b. Thus it can be seen that properly controlled shingle positioning escapement 112 and single shingle shuttle 120 can operate to move a single shingle either to the right or left in order to begin a stack of shingles having a predetermined number of shingles, this predetermined number being an odd number. It is preferred that the movement of single shingle shuttle, when urging a single shingle 136b either to the right (towards jogger box 128) or to the left (towards jogger box 126), operate to always provide the single shingle to start the desired odd number of shingles in a stack in order to prevent any sealing stripe (applied at work station 70) from being bundled on contact with the mineral granule covered surface of the adjacent shingle in a stack. Wrapping material used to bind the stacks of shingles has a release coating on the surface thereof in contact with the sealing stripe covered back surface of such single shingle 136b.

In contrast, when double shingle shuttle 122 operates to move a single shingle 136a, it is desired that this single shingle be positioned on the top of the stack.

The desired sequence of shuttle operations becomes apparent from FIGS. 4a, 4b and 4c and hence will not be belabored further. It should be noted that the particular dimensions chosen for Applicants' preferred embodiment of laminated shingles 136a and 136b have made the formation of stacks of odd numbers of shingles desirable. A shingle having a different coverage however may not require the formation of stacks having odd numbers of shingles and hence the operation of shingle positioning escapement 112 and single shingle shuttle 120 would be unnecessary. However with shingles dimensioned according to Applicants' preferred embodiment, Applicants have found that each seventeenth pair of shingles arriving at the shingle shuttle station is operated on in a manner as shown in FIG. 4c such that one shingle of this seventeenth pair goes to jogger box 126 and the other shingle of the seventeenth pair of shingles goes to the other jogger box. Clearly this splitting operation is accomplished equally well by the single shingle shuttle pushing the single shingle 136b to the left and the double shingle shuttle moving the single shingle 136a to the right, and in fact every other operation of the single shingle shuttle 120 and escapement 112 accomplishes this.

The net result of the operation of the shuttles at the shingle shuttle station is that shingles derived from the same set of shingle members produced at a remote cutting station are selectively formed into pairs of shingles and moved to form stacks of these pairs of a controlled number of pairs of shingles. Alternatively and additionally the shuttle in the overall collating apparatus can form stacks of odd numbers of shingles by selectively moving one of the pairs of shingles to respective stacks of shingle pairs, thus giving great versatility to the overall collating operation.

We claim:

1. A method of forming laminated shingles comprising:
   (a) providing a substantially continuous web of composition shingle material;
   (b) cutting said web to define a series of sets of shingle members along the length of said web, each said set comprising at least one overlay portion and at least one underlay portion, the shingle members in each said set having a predetermined positional relationship with one another in said series;
   (c) separating said members defined in step (b) from one another while maintaining the members in said sets and maintaining said sets in said series;
   (d) conveying said sets to a laminating work station;
   (e) laminating each said underlay portion in a set to an overlay portion from the same set to form a laminated shingle; and
   (f) collating the shingles formed in step (e) to form stacks of shingles having a predetermined number of shingles in each stack.

2. A method of manufacturing laminated shingles wherein the step of cutting further includes cutting a segment of said web such that said segment extends across the width of said web and such that said segment comprises at least one underlay portion and at least one overlay portion.

3. A method of manufacturing laminated shingles as set forth in claim 2 wherein said segment of said web comprises a pair of overlay portions having interdigitated tabs, and further includes a pair of underlay portions.

4. A method of manufacturing laminated shingles as set forth in claim 3 wherein;
   each said overlay portion in said pair has tabs which differ from one another so as to make one said overlay portion of said pair have a substantially different configuration than the other of said overlay portion of said pair.

5. A method of manufacturing laminated shingles as set forth in claim 2 or claim 3 wherein said overlay portion and said underlay portion of each said set are cut from the same segment of said web.

6. A method of manufacturing laminated shingles as set forth in claim 1 wherein said step of conveying further includes a step of removing to a separate work station overlay portions and underlay portions which do not comprise a set whereby only complete sets are conveyed to said laminating work station.

7. A method of manufacturing a laminated shingle as set forth in claim 1 wherein the step of adhering includes the step of applying adhesive to part of the underside of each overlay portion in a set and bringing an underlay portion from the same set into intimate contact with said adhesive on said overlay portion.

8. A method of manufacturing laminated shingles as set forth in claim 1 or claim 4 wherein the step of collating further includes the step of forming pairs of shingles such that the shingles in said pairs are back-to-back with one another with the underlay portions nested next to one another and positioned between the overlay portions of said pairs; stacking said pairs to form said stacks having a predetermined number of said pairs; and bundling said pairs to form a bundle of shingles.

9. A method of manufacturing laminated shingles as set forth in claim 8 wherein each pair of shingles are made from overlay portions and underlay portions derived from the same set.

10. A method of manufacturing laminated shingles as set forth in claim 1 wherein the step of providing said web includes
    providing a web of asphalt impregnated fibrous mat;
    coating at least one side of said impregnated mat with an adhesive material;
    applying bands of mineral granules to said adhesive coated surface, said bands comprising mineral granules having colors contrasting with adjacent bands, the colors of said bands varying substantially randomly along the length of said mat to form said web of composition shingle material.

11. A method of manufacturing laminated shingles as set forth in claim 10 wherein at least some of said color bands each comprise a plurality of color drops, and each band being positionally aligned across the width of said mat to correspond to one of said underlay portions and said overlay portions.

12. An apparatus for making laminated shingles comprising:
   (a) a cutter roll for defining, in a substantially continuous web of composition shingle material, a series of sets of shingle members, each said set of said series of sets comprising at least one underlay portion and one overlay portion having a predetermined positional relationship with one another in said series;
   (b) means for separating said underlay portions and said overlay portions defined by said cutter roll from one another;
   (c) a conveyor for moving to a first work station and then to a second work station said set of shingle members;
   (d) an adhesive striper positioned at said first work station in the path of said conveyor for applying adhesive to at least one of said overlay portion and said underlay portion in said set;
   (e) laminating rollers in the path of said conveyor at said second work station for adhesively bonding an overlay portion in a set to an underlay portion from the same set to form a laminated shingle; and
   (f) a collator for assembling the laminated shingles into stacks of shingles.

13. An apparatus for making laminated shingles as set forth in claim 12 wherein said cutter roll includes cutting blades extending across the width of said web for defining a segment of said web, said cutter roll including further blades for defining at least one overlay portion and one underlay portion in each said segment.

14. An apparatus for making laminated shingles according to claim 13 wherein said further blades are configured to define in said segment a pair of overlay portions having interdigitated tabs and a pair of underlay portions.

15. An apparatus for making laminated shingles as set forth in claims 13 or 14 wherein each said set comprises an underlay portion and an overlay portion from the same segment of said web.

16. An apparatus for making laminated shingles as set forth in claim 12 wherein said conveyor further includes an escapement positioned along the direction of movement of said shingle members and further including means for sensing the presence and absence of members not comprising a set on said conveyor; said escapement cooperating with said means for sensing to eject from said conveyor any members which do not comprise a set,
   whereby only complete sets are moved to said first work station by said conveyor.

17. An apparatus for making laminated shingles as set forth in claim 11 wherein said collator further includes means for inverting every other of said laminated shingles so as to form a pair of shingles, the shingles in said pair of shingles being back-to-back with the underlay portions of said pair of shingles nested next to one another and positioned between overlay members of said pair of shingles.

18. An apparatus for making laminated shingles as set forth in claim 17 wherein each said set consists of a pair of overlay portions and a pair of underlay portions and wherein said collator includes means for assembling said pair of shingles from shingles assembled by said collator made from overlay portions and underlay portions of the same set.

19. An apparatus for making laminated shingles as set forth in claim 17 wherein said collator includes a shuttle for alternately moving said pairs of shingles in a first direction and a second direction so as to substantially simultaneously form a first stack and a second stack of shingles; said shuttle further operating to selectively separate one pair of shingles such that one shingle of said selected pair of shingles is provided to said first stack and the other shingle of said selected pair of shingles is provided to said second stack so as to form simultaneous stacks of shingles having therein an odd number of shingles.

* * * * *

UNITED STATES PATENT AND TRADEMARK OFFICE
CERTIFICATE OF CORRECTION

PATENT NO. : 4,233,100

DATED : November 11, 1980

INVENTOR(S) : Richard N. Cunningham; Douglas D. Smith, Romain E. Loeffler

It is certified that error appears in the above-identified patent and that said Letters Patent are hereby corrected as shown below:

Column 1 Line 33 should be "thereof."
Column 9 Line 67 should be "along"
Column 10 Line 8 should be "conveyor"
Column 10 Line 9 should be "acceleration"
Column 11 Line 10 should be "laminated"

Signed and Sealed this

Fourteenth Day of April 1981

[SEAL]

Attest:

RENE D. TEGTMEYER

Attesting Officer     Acting Commissioner of Patents and Trademarks